(12) United States Patent
Bennett et al.

(10) Patent No.: US 7,149,211 B2
(45) Date of Patent: *Dec. 12, 2006

(54) VIRTUAL REASSEMBLY SYSTEM AND METHOD OF OPERATION THEREOF

(75) Inventors: Victor A. Bennett, Rockwall, TX (US); Leslie Zsohar, Round Rock, TX (US); Shannon E. Lawson, Pflugerville, TX (US); Sean W. McGee, Austin, TX (US); David P. Sonnier, Austin, TX (US); David B. Kramer, Austin, TX (US)

(73) Assignee: Agere Systems Inc., Allowtown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/993,627

(22) Filed: Nov. 19, 2004

(65) Prior Publication Data

US 2005/0089039 A1    Apr. 28, 2005

Related U.S. Application Data

(63) Continuation of application No. 09/798,472, filed on Mar. 2, 2001, now Pat. No. 6,850,516.

(60) Provisional application No. 60/186,424, filed on Mar. 2, 2000, provisional application No. 60/186,516, filed on Mar. 2, 2000.

(51) Int. Cl.
    *H04L 12/50* (2006.01)

(52) U.S. Cl. .................. 370/357; 370/392; 370/395.52
(58) Field of Classification Search ........ 370/351–357, 370/389, 392, 395.1, 395.52, 474, 476
See application file for complete search history.

(56) References Cited

U.S. PATENT DOCUMENTS

| | | | |
|---|---|---|---|
| 5,917,821 A | 6/1999 | Gobuyan et al. | |
| 5,917,828 A | 6/1999 | Thompson | |
| 5,978,951 A * | 11/1999 | Lawler et al. | 714/758 |
| 6,137,798 A | 10/2000 | Nishihara et al. | |
| 6,157,641 A * | 12/2000 | Wilford | 370/389 |
| 6,243,667 B1 * | 6/2001 | Kerr et al. | 703/27 |
| 6,259,699 B1 * | 7/2001 | Opalka et al. | 370/398 |
| 6,320,859 B1 * | 11/2001 | Momirov | 370/395.1 |
| 6,711,153 B1 | 3/2004 | Hebb et al. | |
| 6,721,316 B1 | 4/2004 | Epps et al. | |
| 6,791,947 B1 * | 9/2004 | Oskouy et al. | 370/238 |
| 6,836,479 B1 * | 12/2004 | Sakamoto et al. | 370/389 |

* cited by examiner

*Primary Examiner*—Dmitry Levitan

(57) ABSTRACT

A virtual reassembly system for use with a fast pattern processor and a method of operating the same. In one embodiment, the virtual reassembly system includes a first pass subsystem configured to convert a packet of a protocol data unit into at least one processing block, queue the at least one processing block based upon a header of the packet and determine if the packet is a last packet of the protocol data unit. The virtual reassembly system further includes a second pass subsystem configured to virtually reassemble the protocol data unit by retrieving the at least one processing block based upon the queue.

29 Claims, 7 Drawing Sheets

VIRTUAL REASSEMBLY SYSTEM AND METHOD OF OPERATION THEREOF

CROSS-REFERENCE TO APPLICATIONS

This application is a continuation of U.S. patent application Ser. No. 09/798,472, now U.S. Pat. No. 6,850,516 entitled "A VIRTUAL REASSEMBLY SYSTEM AND METHOD OF OPERATION THEREOF, filed on Mar. 2, 2001, which claims the benefits of U.S. Provisional Application No. 60/186,424 entitled "FPP" to David Sonnier, et al., filed on Mar. 2, 2000, and of U.S. Provisional Application No. 60/186,516 entitled "RSP" to David Sonnier, et al., filed on Mar. 2, 2000. The above-listed applications are commonly assigned with the present invention and are incorporated herein by reference as if reproduced herein in its entirety.

CROSS-REFERENCE TO RELATED APPLICATIONS

This application is related to the following U.S. patent applications:

| Reference No. | Title | Inventor | Date |
| --- | --- | --- | --- |
| BENNETT 4-1-2-4-2 | A Function Interface System And Method of Processing Issued Functions Between Co-Processors | Bennett, et al. | Filed Mar. 2, 2001 |
| BROWN 2 | A Checksum Engine And Method of Operation Thereof | David A. Brown | Filed Mar. 2, 2001 |

The above-listed applications are commonly assigned co-pending with the present invention and are incorporated herein by reference as if reproduced herein in their entirety.

TECHNICAL FIELD OF THE INVENTION

The present invention is directed, in general, to a communications system and, more specifically, to a virtual reassembly system and method of operating the same.

BACKGROUND OF THE INVENTION

Communications networks are currently undergoing a revolution brought about by the increasing demand for real-time information being delivered to a diversity of locations. Many situations require the ability to transfer large amounts of data across geographical boundaries with increasing speed and accuracy. However, with the increasing size and complexity of the data that is currently being transferred, maintaining the speed and accuracy is becoming increasingly difficult.

Early communications networks resembled a hierarchical star topology. All access from remote sites was channeled back to a central location where a mainframe computer resided. Thus, each transfer of data from one remote site to another, or from one remote site to the central location, had to be processed by the central location. This architecture is very processor-intensive and incurs higher bandwidth utilization for each transfer. This was not a major problem in the mid to late 1980s where fewer remote sites were coupled to the central location. Additionally, many of the remote sites were located in close proximity to the central location. Currently, hundreds of thousands of remote sites are positioned in various locations across assorted continents. Legacy networks of the past are currently unable to provide the data transfer speed and accuracy demanded in the marketplace of today.

In response to this exploding demand, data transfer through networks employing distributed processing has allowed larger packets of information to be accurately and quickly distributed across multiple geographic boundaries. Today, many communication sites have the intelligence and capability to communicate with many other sites, regardless of their location. This is typically accomplished on a peer level, rather than through a centralized topology, although a host computer at the central site can be appraised of what transactions take place and can maintain a database from which management reports are generated and operation issues addressed.

Distributed processing currently allows the centralized site to be relieved of many of the processor-intensive data transfer requirements of the past. This is typically accomplished using a data network, which includes a collection of routers. The routers allow intelligent passing of information and data files between remote sites. However, increased demand and the sophistication required to route current information and data files quickly challenged the capabilities of existing routers. Also, the size of the data being transmitted is dramatically increasing. Some efficiencies are obtained by splitting longer data files into a collection of smaller, somewhat standardized cells for transmission or routing. However, these efficiencies are somewhat offset by the processing required to reassemble or process the cells at nodes within the network.

More specifically, the physical reassembly process requires the system to physically reassemble an entire protocol data unit (data file) encapsulated in the cells before processing can be performed on the protocol data unit. This physical reassembly process increases the processing time and therefore decreases the throughput of the router. In view of the ever increasing demand for higher transmission speeds this is highly undesirable.

Accordingly, what is needed in the art is a system to overcome the deficiencies of the prior art.

SUMMARY OF THE INVENTION

To address the above-discussed deficiencies of the prior art, the present invention provides a virtual reassembly system for use with a fast pattern processor and a method of operating the same. In one embodiment, the virtual reassembly system includes: (1) a first pass subsystem configured to convert a packet of a protocol data unit into at least one processing block, queue the at least one processing block based upon a header of the packet and determine if the packet is a last packet of the protocol data unit and (2) a second pass subsystem configured to virtually reassemble the protocol data unit by retrieving the at least one processing block based upon the queue.

In another embodiment, the present invention provides a method of operating a virtual reassembly system that includes: (1) converting in a first pass subsystem a packet of a protocol data unit into at least one processing block, queuing the at least one processing block based upon a header of the packet and determining if the packet is a last packet of the protocol data unit and (2) virtually reassembling in a second pass subsystem the protocol data unit by retrieving the at least one processing block based upon the queue.

The present invention also provides, in one embodiment, a fast pattern processor that includes a data buffer that stores processing blocks and a context memory subsystem associated with the data buffer that receives the processing blocks. The fast pattern processor also includes a virtual reassembly system, having: (1) a first pass subsystem that converts packets of different protocol data units into the processing blocks, stores the processing blocks in the data buffer and the context memory, queues the processing blocks based upon a header of each of the packets and determines if each of the packets is a last packet of one of the different protocol data units and (2) a second pass subsystem that virtually reassembles the different protocol data units by retrieving the processing blocks based upon the queues.

In another embodiment, the present invention provides router that includes a first and second interface subsystem and a fast pattern processor configured to receive a packet of a protocol data unit from the first interface subsystem. The fast pattern processor includes a virtual reassembly system having: (1) a first pass subsystem configured to convert the packet of the protocol data unit into at least one processing block, queue the at least one processing block based upon a header of the packet and determine if the packet is a last packet of the protocol data unit and (2) a second pass subsystem configured to virtually reassemble the protocol data unit by retrieving the at least one processing block based upon the queue. The router also may include a routing switch processor configured to receive at least one of the packet or the protocol data unit from the fast pattern processor and transmit via the second interface subsystem.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
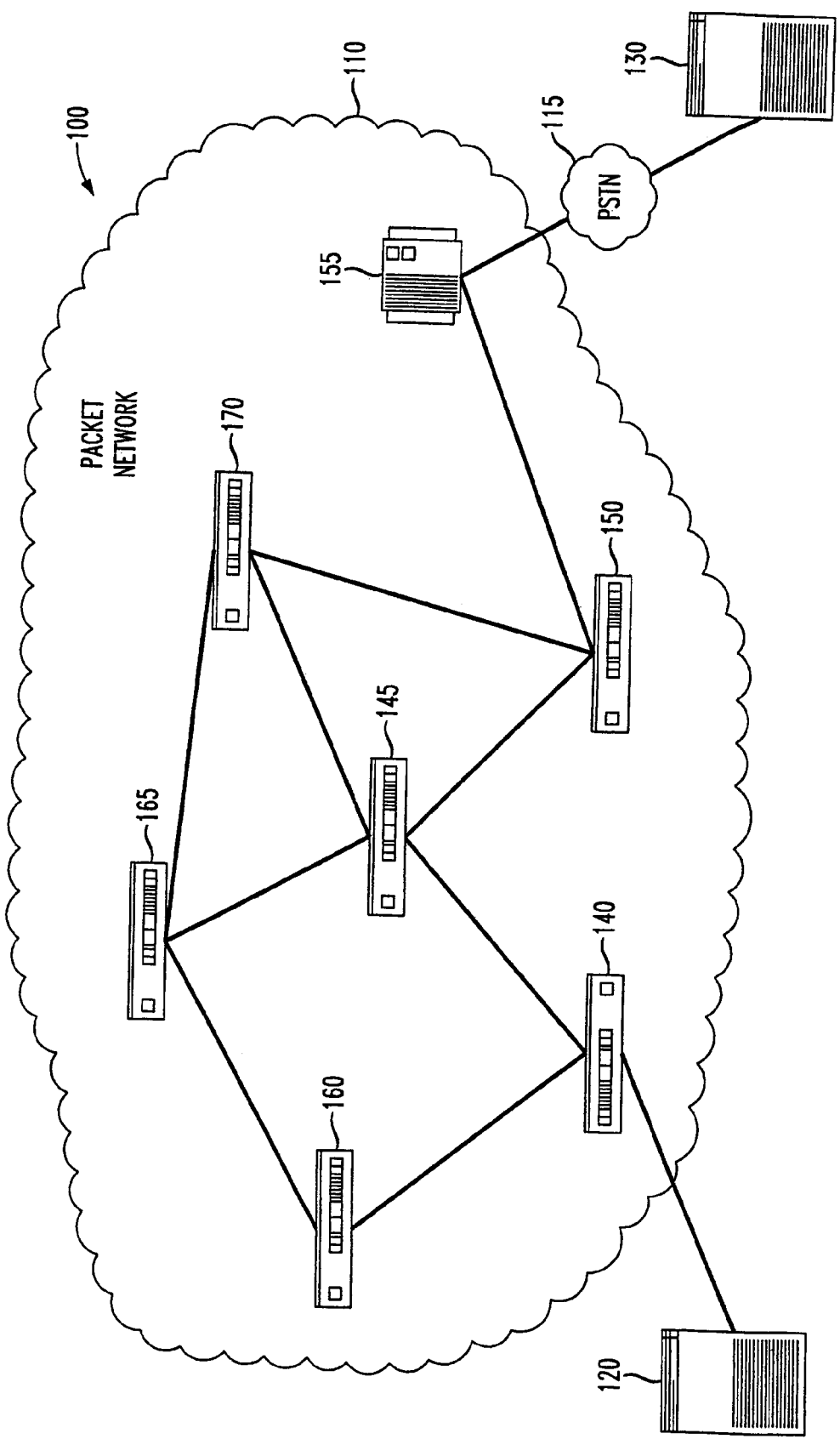
FIG. 1 illustrates a block diagram of an embodiment of a communications network constructed in accordance with the principles of the present invention.

Referring initially to FIG. 1, illustrated is a block diagram of an embodiment of a communications network, generally designated 100, constructed in accordance with the principles of the present invention. The communications network 100 is generally designed to transmit information in the form of a data packet from one point in the network to another point in the network.

As illustrated, the communications network 100 includes a packet network 110, a public switched telephone network (PSTN) 115, a source device 120 and a destination device 130. In the illustrative embodiment shown in FIG. 1, the packet network 110 comprises an Asynchronous Transfer Mode (ATM) network. However, one skilled in the art readily understands that the present invention may use any type of packet network. The packet network 110 includes routers 140, 145, 150, 160, 165, 170 and a gateway 155. One skilled in the pertinent art understands that the packet network 110 may include any number of routers and gateways.

The source device 120 may generate a data packet to be sent to the destination device 130 through the packet network 110. In the illustrated example, the source device 120 initially sends the data packet to the first router 140. The first router 140 then determines from the data packet which router to send the data packet to based upon routing information and network loading. Some information in determining the selection of a next router may include the size of the data packet, loading of the communications link to a router and the destination. In this example, the first router 140 may send the data packet to the second router 145 or fourth router 160.

The data packet traverses from router to router within the packet network 110 until it reaches the gateway 155. In one particular example, the data packet may travers along a path that includes the first router 140, the fourth router 160, the fifth router 165, the sixth router 170, the third router 150 and finally to the gateway 155. The gateway 155 converts the data packet from the protocol associated with the packet network 110 to a different protocol compatible with the PSTN 115. The gateway 155 then transmits the data packet to the destination device 130 via the PSTN 115. However, in another example, the data packet may traverse along a different path such as the first router 140, the second router 145, the third router 150 and finally to the gateway 155. It is generally desired when choosing a subsequent router, the path the data packet traverses should result in the fastest throughput for the data packet. It should be noted, however, that this path does not always include the least number of routers.

Figure 2:
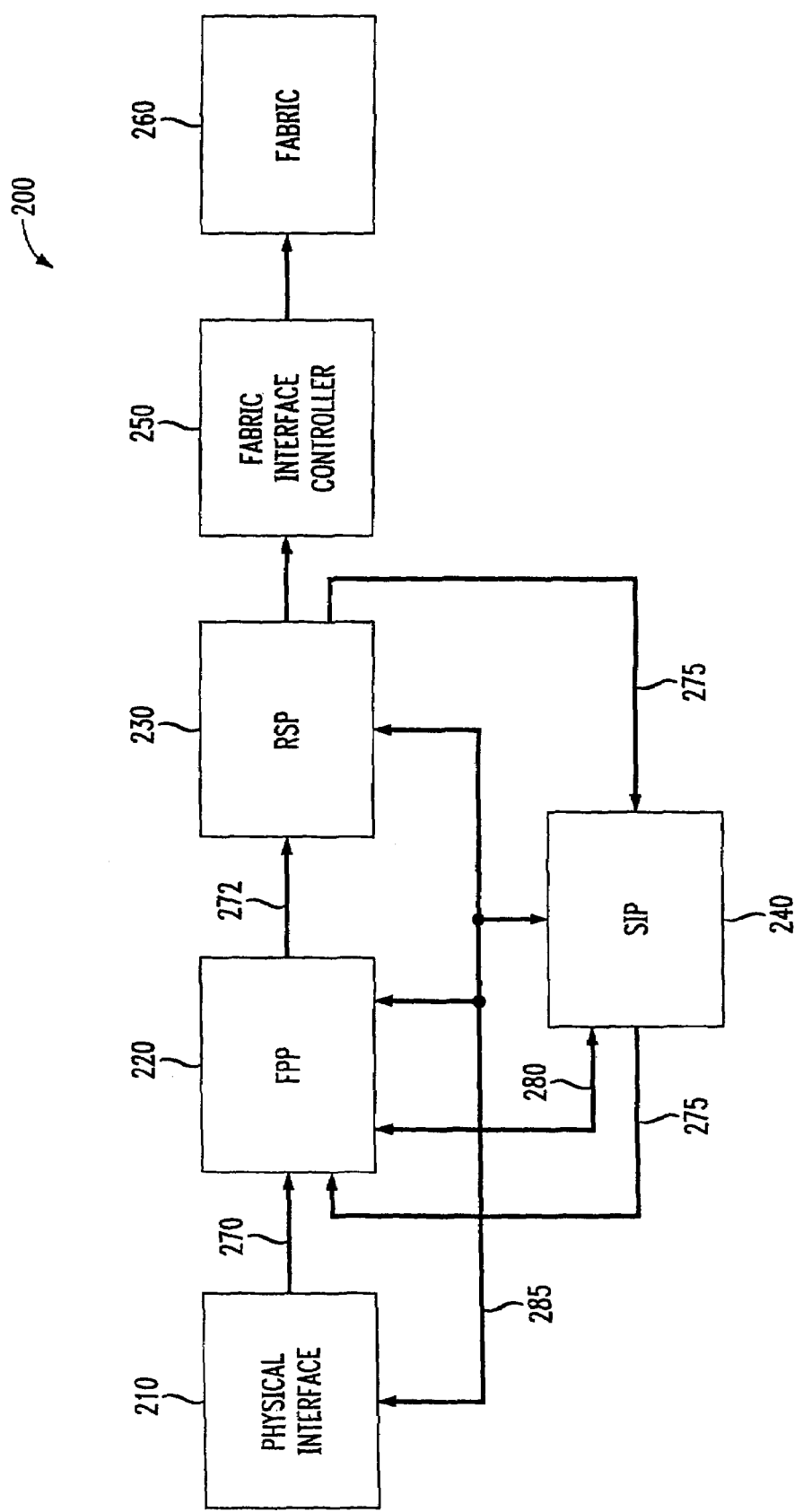
FIG. 2 illustrates a block diagram of an embodiment of a router architecture constructed in accordance with the principles of the present invention.

Turning now to FIG. 2, illustrated is a block diagram of an embodiment of a router architecture, generally designated 200, constructed in accordance with the principles of the present invention. The router architecture 200, in one embodiment, may be employed in any of the routers illustrated in FIG. 1. The router architecture 200 provides a unique hardware and software combination that delivers high-speed processing for multiple communication protocols with full programmability. The unique combination provides the programmability of traditional reduced instruction set computing (RISC) processors with the speed that, until now, only application-specific integrated circuit (ASIC) processors could deliver.

In the embodiment shown in FIG. 2, the router architecture 200 includes a physical interface 210, a fast pattern processor (FPP) 220, a routing switch processor (RSP) 230, and a system interface processor (SIP) 240. The router architecture 200 may also includes a fabric interface controller 250 which is coupled to the RSP 230 and a fabric network 260. It should be noted that other components not shown may be included within the router architecture 200 without departing from the scope of the present invention.

The physical interface 210 provides coupling to an external network. In an exemplary embodiment, the physical interface 210 is a POS-PHY/UTOPIA level 3 interface. The FPP 220, in one embodiment, may be coupled to the physical interface 210 and receives a data stream that includes protocol data units from the physical interface 210. The FPP 220 analyzes and classifies the Protocol data units and subsequently concludes processing by outputting packets to the RSP 230.

The FPP 220, in conjunction with a powerful high-level functional programming language (FPL), is capable of implementing complex pattern or signature recognition and operates on the processing blocks containing those signatures. The FPP 220 has the ability to perform pattern analysis on every byte of the payload plus headers of a data stream. The pattern analysis conclusions may then be made available to a system logic or to the RSP 230, allowing processing block manipulation and queuing functions. The FPP 220 and RSP 230 provide a solution for switching and routing. The FPP 220 further provides glueless interfaces to the RSP 230 and the SIP 240 to provide a complete solution for wire-speed processing in next-generation, terabit switches and routers.

As illustrated in FIG. 2, the FPP 220 employs a first communication link 270 to receive the data stream from the physical interface 210. The first communication link 270 may be an industry-standard UTOPIA Level 3/UTOPIA Level 2/POS-PHY Level 3 interface. Additionally, the FPP 220 employs a second communication link 272 to transmit packet and conclusions to the RSP 230. The second communication link 272 may be POS-PHY Level 3 interface.

The FPP 220 also includes a management path interface (MPI) 275, a function bus interface (FBI) 280 and a configuration bus interface (CBI) 285. The MPI 275 enables the FPP 220 to receive management frames from a local microprocessor. In an exemplary embodiment, this may be handled through the SIP 240. The FBI 280 connects the FPP 220 and the SIP 240, or custom logic in certain situations, for external processing of function calls. The CBI 285 connects the FPP 220 and other devices (e.g., physical interface 210 and RSP 230) to the SIP 240. Other interfaces (not shown), such as memory interfaces, are also well within the scope of the present invention.

The FPP 220 provides an additional benefit in that it is programmable to provide flexibility in optimizing performance for a wide variety of applications and protocols. Because the FPP is a programmable processor rather than a fixed-function ASIC, it can handle new protocols or applications as they are developed as well as new network functions as required. The FPP 220 may also accommodate a variety of search algorithms. These search algorithms may be applied to large lists beneficially.

The RSP 230 is also programmable and works in concert with the FPP 220 to process the protocol data units classified by the FPP 220. The RSP 230 uses the classification information received from the FPP 220 to determine the starting offset and the length of the Protocol data unit payload, which provides the classification conclusion for the Protocol data unit. The classification information may be used to determine the port and the associated RSP 230 selected for the Protocol data unit. The RSP 230 may also receive additional Protocol data unit information passed in the form of flags for further processing.

The RSP 230 also provides programmable traffic management including policies such as random early discard (RED), weighted random early discard (WRED), early packet discard (EPD) and partial packet discard (PPD). The RSP 230 may also provide programmable traffic shaping, including programmable per queue quality of service (QoS) and class of service (CoS) parameters. The QoS parameters include constant bit rate (CBR), unspecified bit rate (UBR), and variable bitrate (VBR). Correspondingly, CoS parameters include fixed priority, round robin, weighted round robin (WRR), weighted fair queuing (WFQ) and guaranteed frame rate (GFR).

Alternatively, the RSP 230 may provide programmable packet modifications, including adding or stripping headers and trailers, rewriting or modifying contents, adding tags and updating checksums and CRCs. The RSP 230 may be programmed using a scripting language with semantics similar to the C language. Such script languages are well known in the art. Also connected to the RSP 230 are the fabric interface controller 250 and the fabric network 260. The fabric interface controller 250 provide the physical interface to the fabric 260, which is typically a communications network.

The SIP 240 allows centralized initialization and configuration of the FPP 220, the RSP 230 and the physical interfaces 210, 250. The SIP 240, in one embodiment, may provide policing, manage state information and provide a peripheral component interconnect (PCI) connection to a host computer. The SIP 240 may be a PayloadPlus™ Agere System Interface commercially available from Agere Systems, Inc.

Figure 3:
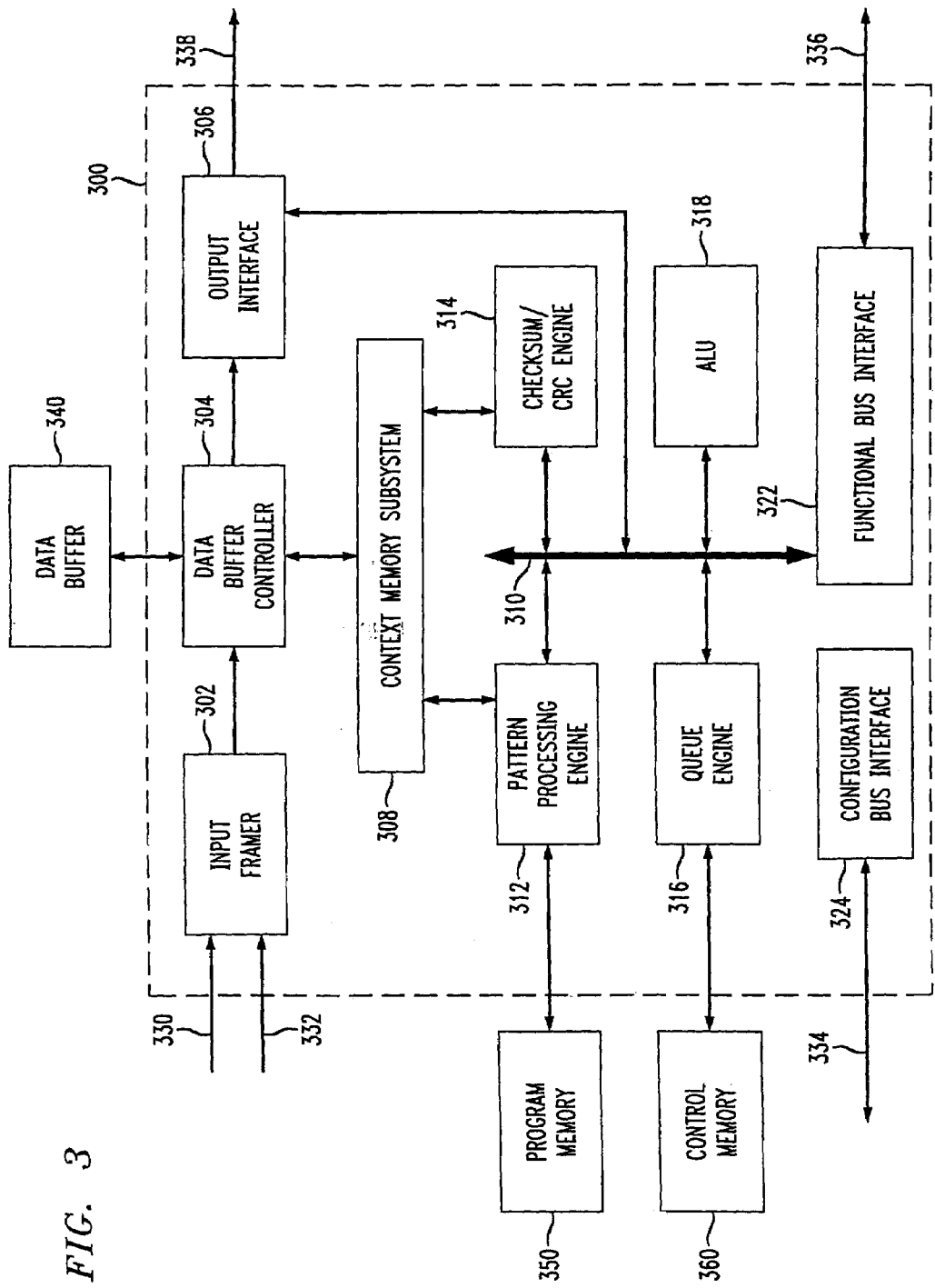
FIG. 3 illustrates a block diagram of an embodiment of a fast pattern processor constructed in accordance with the principles of the present invention.

Turning now to FIG. 3, illustrated is a block diagram of an embodiment of a fast pattern processor (FPP), generally designated 300, constructed in accordance with the principles of the present invention. The FPP 300 includes an input framer 302 that receives protocol data units via external input data streams 330, 332. The input framer 302 frames packets containing the Protocol data units into 64-byte processing blocks and stores the processing blocks into an external data buffer 340. The input data streams 330, 332 may be 32-bit UTOPIA/POS-PHY from PHY and 8-bit POS-PHY management path interface from SIP 240 (FIG. 2), respectively.

Typically, a data buffer controller 304 is employed to store the processing blocks to the external data buffer 340. The data buffer controller 304 also stores the processing blocks and associated configuration information into a portion of a context memory subsystem 308 associated with a context, which is a processing thread. As illustrated, the context memory subsystem 308 is coupled to a data buffer controller 304.

Additionally, the context memory subsystem 308 is coupled to a checksum/cyclical redundancy check (CRC)

engine 314 and a pattern processing engine 312. The checksum/CRC engine 314 performs checksum or CRC functions on processing block and on the Protocol data units embodied with the processing block. The pattern processing engine 312 performs pattern matching to determine how Protocol data units are classified and processed. The pattern processing engine 312 is coupled to a program memory 350.

The FPP 300 further includes a queue engine 316 and an arithmetic logic unit (ALU) 318. The queue engine 316 manages replay contexts for the FPP 300, provides addresses for block buffers and maintains information on blocks, Protocol data units, and connection queues. The queue engine 316 is coupled to an external control memory 360 and the internal function bus 310. The ALU 318 is coupled to the internal function bus 310 and is capable of performing associated computational functions.

Also coupled to the internal function bus 310 is a functional bus interface 322. The functional bus interface 322 passes external functional programming language function calls to external logic through a data port 336. In one exemplary embodiment, the data port 336 is a 32-bit connection to the SIP 240 (FIG. 2). The FPP 300 also includes a configuration bus interface 324 for processing configuration requests from externally coupled processors. As illustrated, the configuration bus interface 324 may be coupled to a data port 334, such as an 8-bit CBI source.

Additionally, coupled to the internal function bus 310 is an output interface 306. The output interface 306 sends Protocol data units and their classification conclusions to the downstream logic. The output interface 306 may retrieve the processing blocks stored in the data buffer 340 and send the Protocol data units embodied within the processing blocks to an external unit through an output data port 338. The output data port 338, in an exemplary embodiment, is a 32-bit POS-PHY connected to the RSP 230 (FIG. 2).

Figure 4:
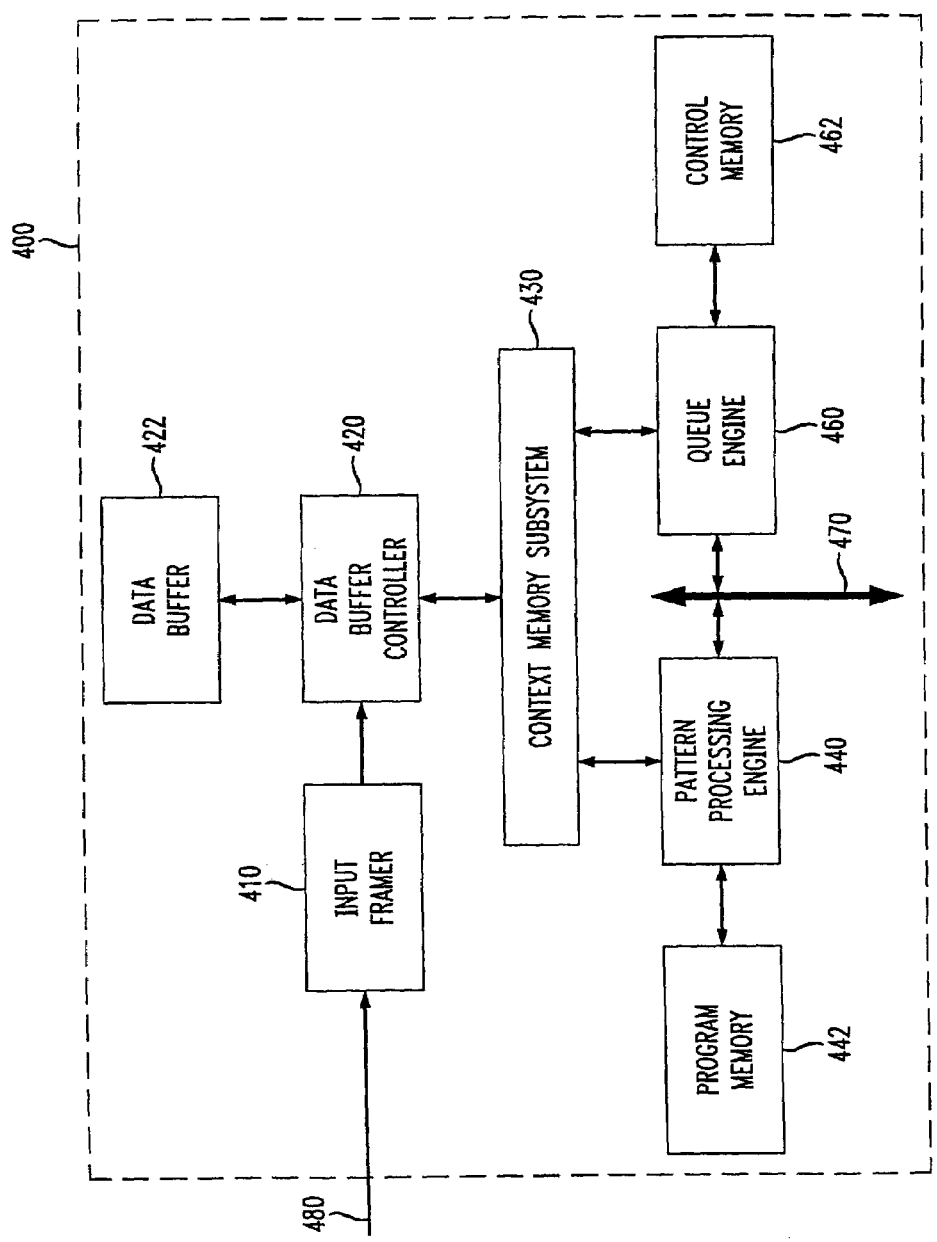
FIG. 4 illustrates a block diagram of an embodiment of a first pass subsystem of a virtual reassembly system constructed in accordance with the principles of the present invention.

Turning now to FIG. 4, illustrated is a block diagram of an embodiment of a first pass subsystem, generally designated 400, of a virtual reassembly system constructed in accordance with the principles of the present invention. The present invention provides a virtual reassembly system that advantageously employs a two-pass system that allows packets of a protocol data unit to be processed without recreating (physically reassembling) the entire protocol data unit in a contiguous portion of memory. For purposes of the present invention, a "protocol data unit" is the underlying message in a specific protocol that may be transmitted via packets over a network. For example, a protocol data unit may be an Internet Protocol ("IP") message that is transmitted over an Asynchronous Transfer Mode ("ATM") network. In an ATM network, the IP message is broken into ATM cells (packets) before transmission over the ATM network. Of course, however, a protocol data unit may be any protocol message transmitted over a network and a packet may be a portion of the protocol data unit or the entire protocol data unit.

The virtual reassembly system includes the first pass subsystem 400 that is configured to convert a packet of a protocol data unit into at least one processing block, queue the processing block(s) based upon a header of the packet and determine if the packet is a last packet of the protocol data unit. In the illustrated embodiment, the first pass subsystem 400 includes an input framer 410 that is configured to convert the packet from an input 480 into one or more processing blocks. For the purposes of the present invention, the phrase "configured to" means that the device, the system or the subsystem includes the necessary software, hardware, firmware or a combination thereof to accomplish the stated task. "Convert a packet" includes storing or framing at least a portion of the packet in a processing block. A "processing block" is a storage area employed in processing the packets associated with protocol data units and may include additional information.

As the input framer 410 converts each packet into one or more processing blocks, the input framer 410 may also be configured to determine an offset to a data portion of the processing block and assign a context. For example, if the protocol data unit is an IP message transmitted via ATM cells, each ATM cell (packet) is stored in a processing block. The input framer 410 determines the offset in the processing block to the start of the ATM cell. In another embodiment, the input framer 410 may determine the offset in the processing block to the start of a payload of the ATM cell. For purposes of the present invention, a "context" is a processing thread identification and may include additional information. The context may be used by the virtual reassembly system to track and process packets and processing blocks.

In the illustrated embodiment, the first pass subsystem 400 also includes a data buffer controller 420, a data buffer 422 and a context memory subsystem 430. The data buffer controller 420 is configured to receive processing blocks from the input framer 410 and send each of the processing blocks to the data buffer 422 and the context memory subsystem 430. The data buffer 422 stores each processing block for processing in the second pass. The context memory subsystem 430 is configured to receive and associate each processing block with a context for processing.

The first pass subsystem 400 may also include a pattern processing engine 440 and a program memory 442. The pattern processing engine 440 is configured to receive processing blocks from the input framer 410 via the context memory subsystem 430. The pattern processing engine 440 may also receive a context associated with each processing block or a group of processing blocks. The pattern processing engine 440 also employs the program memory 442 for storage of data or programs. The programs specify the type of function to be performed on each processing block or group of processing blocks. The functions may include validating each processing block, matching information in the header of one or more packets, determining if the packet is in-sequence and statistical analysis. Of course, however, the present invention is not limited to the type of functions listed above. Other embodiments of the present invention may employ different or additional functions.

The pattern processing engine 440, in one embodiment, employs the context associated with each processing block to process and track each of the processing blocks associated with a packet or a protocol data unit. The pattern processing engine 440 also queues each processing block based upon the header of the associated packet. In one embodiment, the pattern processing engine may queue based upon a connection address contained within the header of the packet. Also, the pattern processing engine 440 may determine if the packet received is the last packet of a particular protocol data unit. The last packet indicates when the second pass processing is to be performed for the processing blocks associated with that particular protocol data unit. See FIG. 5 for a discussion of the second pass processing.

In the illustrated embodiment, the first pass subsystem 400 also includes a queue engine 460 and a control memory 462. The queue engine 460 is configured to maintain an order of each packet associated with a particular protocol data unit and maintain an order of all of the processing blocks associated with that particular protocol data unit. The queue engine 460 may employ the control memory 462 in maintaining the order of packets and processing blocks. In one embodiment, the queue engine 460 may use a linked list to maintain the order. In another embodiment, the queue engine 460 maintains order based upon a header of the packet or based upon the header of the protocol data unit.

The queue engine 460 may also receive the processing blocks from the pattern processing engine 440 via an internal function bus 470. The queue engine 460 may then queue the processing blocks in queues maintained within the control memory 462. In another embodiment, the queue engine 460 may receive information from the pattern processing engine 440 that determines how to order the processing blocks via the function bus 470. For information concerning the operation of the function bus see U.S. patent Ser. No. 09/798,454, titled "A Function Interface System and Method of Processing Issued Functions Between Co-processors" and herein incorporated by reference.

In another embodiment, the first pass subsystem 400 receives and processes packets associated with different protocol data units. Packets for one protocol data unit may be interleaved with packets from different protocol data units. The input framer 410, the data buffer controller 420, the context memory subsystem 430, the pattern processing engine 440 and the queue engine 460 advantageously process multiple packets associated with different protocol data units at the same time.

Figure 5:
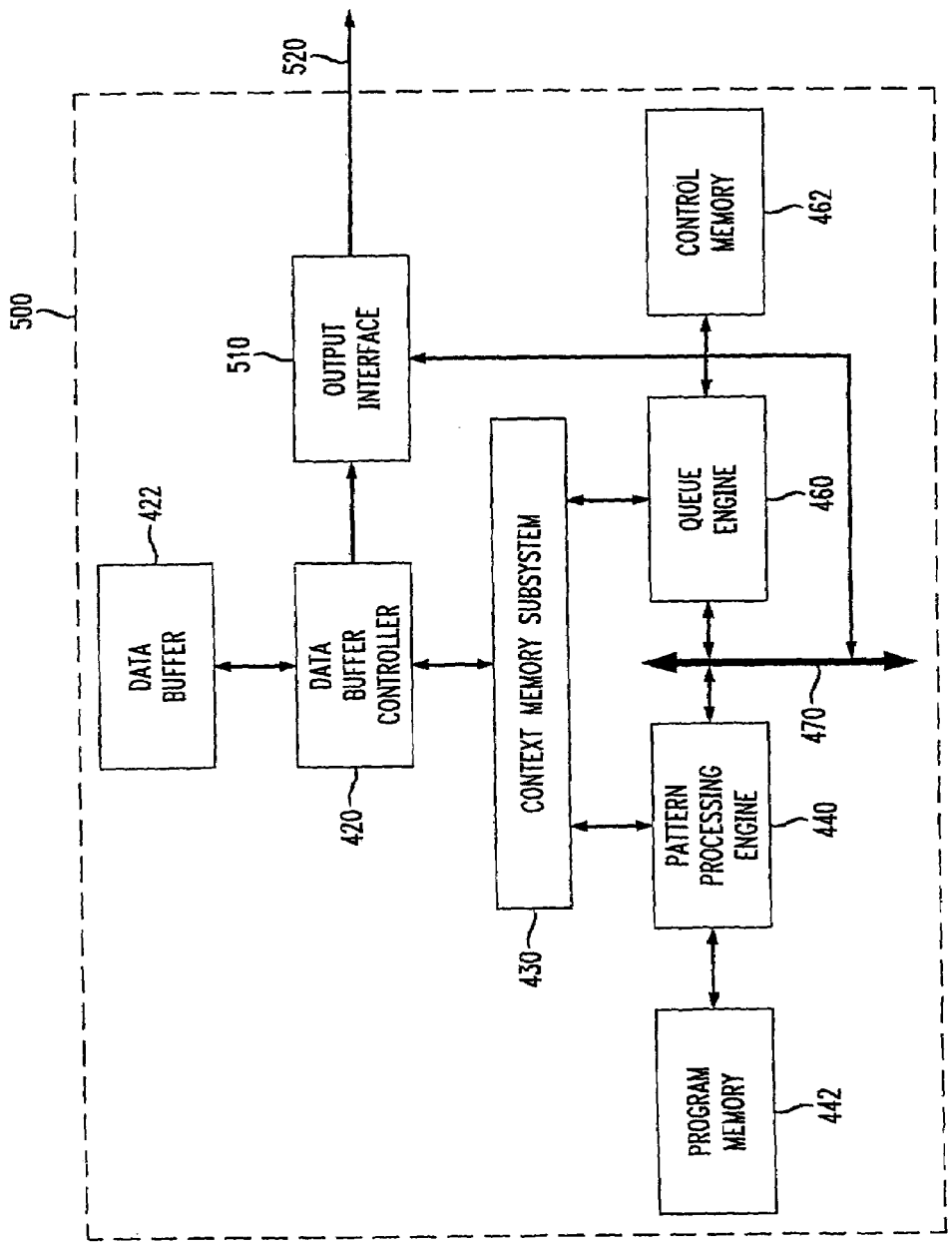
FIG. 5 illustrates a block diagram of an embodiment of a second pass subsystem of a virtual reassembly system constructed in accordance with the principles of the present invention.

Turning now to FIG. 5, illustrated is a block diagram of an embodiment of a second pass subsystem, generally designated 500, of a virtual reassembly system constructed in accordance with the principles of the present invention. The second pass subsystem 500 is configured to virtually reassemble the protocol data unit by retrieving the processing blocks associated with the protocol data unit based upon the queue. The queue may contain linked lists of all of the processing blocks associated with each protocol data unit. In another embodiment, a queue may be associated with a particular protocol data unit and the information referencing each of the processing blocks for that protocol data unit may be queued in the order to be processed. Of course, however, other methods of maintaining order of the processing blocks and association with protocol data units may be employed by the present invention.

Virtual reassembly is the process of performing functions or examining the protocol data unit encapsulated within the processing blocks without examining the header information of each processing block and without physically reassembling the entire protocol data unit. The virtual reassembly is performed in the second pass subsystem 500. The second pass subsystem 500 retrieves each processing block and indexes to the start of the payload within each processing block. The second pass subsystem 500 then examines and processes that portion of the protocol data unit. The second pass subsystem 500, in one embodiment, may examine or extract a destination address from the header of the protocol data unit for routing purposes. For example, the second pass subsystem 500 may examine each payload of ATM cells stored in the processing blocks to determine an IP address or routing information of an IP message encapsulated within the ATM cells.

In the illustrated embodiment, the second pass subsystem 500 may also utilize the pattern processing engine 440. The pattern processing engine 440 is configured to process a payload of a protocol data unit embodied within at least one processing block. When the pattern processing engine 440 requires a processing block, the pattern processing engine 440 sends a request to the queue engine 460 via the function bus 470. The queue engine 460 retrieves the next processing block from the data buffer 422 based upon a queue previously initialized in the first pass subsystem 400. The processing block is stored in the context memory subsystem 430 for processing by the pattern processing engine 440.

In one embodiment, each processing block for a particular protocol data unit is associated with a single context in the context memory subsystem 430. The pattern processing engine 440 may employ that context in the processing of a particular protocol data unit. In a related embodiment, an offset to the start of the protocol data unit (payload) in the processing block is also stored with the processing block in the context memory subsystem 430. The pattern processing engine 440 only accesses that portion of the processing block when processing the protocol data unit. The processing routines employed by the pattern processing engine 440 are indifferent to other information, such as packet headers. Thus, the present invention advantageously allows the processing routines to be programmed to process only the protocol data unit and not have to handle processing the packet associated with the transmission media, thereby increasing the processing speed and throughput.

The second pass subsystem 500, in one embodiment, also includes an output interface subsystem 510 coupled to an output port 520. The output interface subsystem 510 is configured to re-transmit the data contained within each processing block to the output port 520 as the pattern processing engine 440 processes the processing block. The output interface subsystem 510 may receive processing information from the pattern processing engine 440 or the queue engine 460 via the function bus 470. The output interface subsystem 510 may also retrieve each processing block from the data buffer 422 based upon a queue maintained by the queue engine 460.

In one embodiment, the output interface subsystem 510 may re-transmit the packet embodied within the processing blocks or re-transmit only the protocol data unit (payload of the packet) embodied within the processing blocks. For example, the output interface subsystem 510 may re-transmit each of the ATM cells containing a particular IP message, or the output interface subsystem 510 may extract the ATM cell information and re-transmit only the IP message (the protocol data unit). Of course, however, the output interface subsystem 510 may transmit any portion of the processing block as well as additional information associated with a protocol data unit.

One skilled in the art should know that second pass subsystem 500 may process multiple packets from different protocol data units at the same time. In one embodiment, the processing blocks associated with a particular data unit may be queued for re-transmission by the output interface 510 until all of the processing blocks for that particular protocol data unit have been processed by the pattern processing engine 440. In another embodiment, the output interface subsystem 510 may interleave the re-transmission of processing blocks from different protocol data units.

Thus, the first pass subsystem 400 and the second pass subsystem 500 can process the packets and perform virtual reassembly at wire speed. "Wire speed" is a rate at which packets are transmitted over a network. For example, ATM networks may transmit at a rate of 2.5 Gbits and the present invention can receive each packet, perform processing and virtual reassemble at that rate of input. Of course, however, the present invention is not limited to ATM cells and ATM transmission rates. Other embodiments, may employ other transmission media, transmission rates and protocols.

Figure 6:
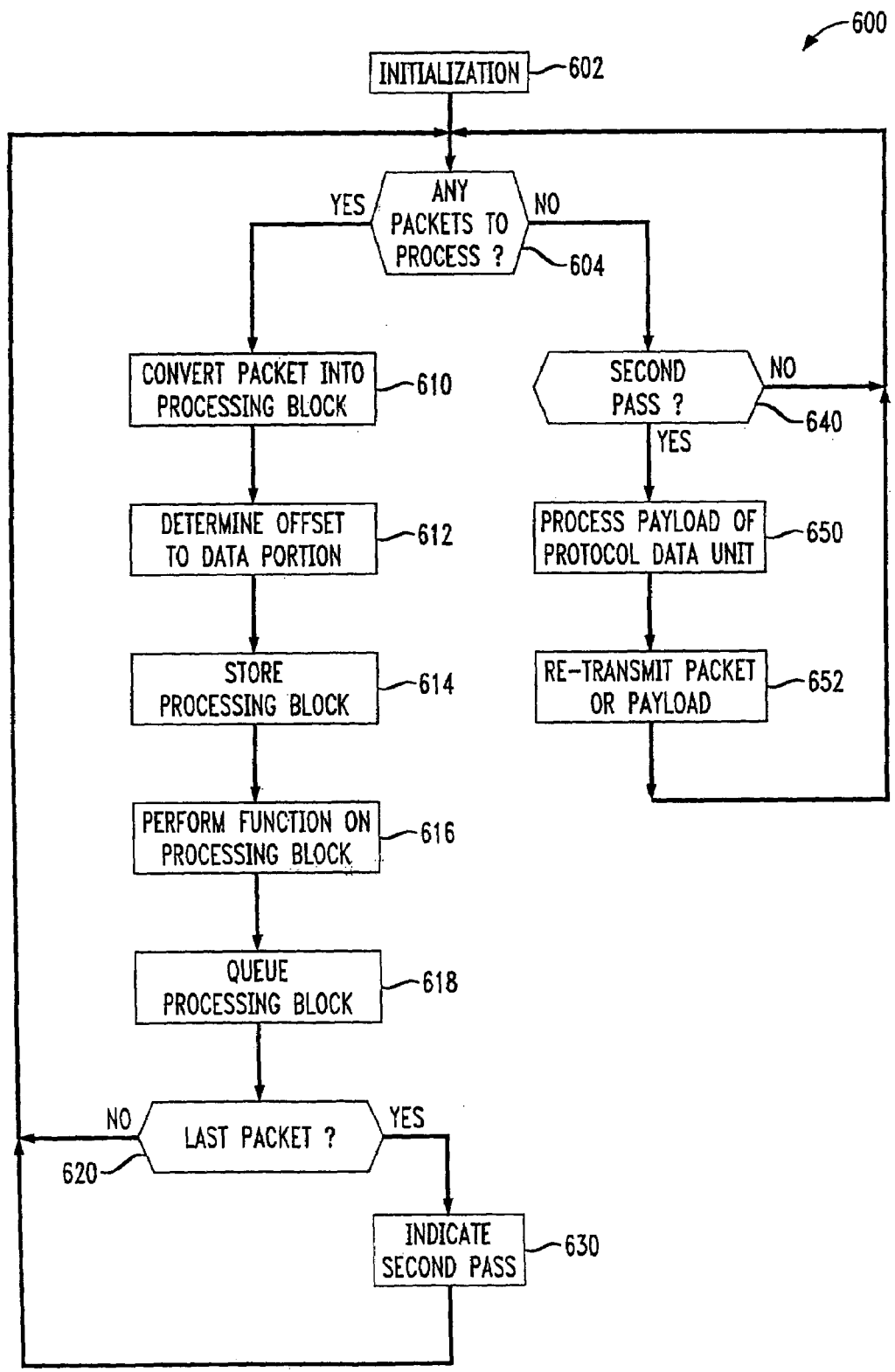
FIG. 6 illustrates a flow diagram of an embodiment of a method of operating a virtual reassembly system constructed in accordance with the principles of the present invention.

Turning now to FIG. 6, illustrated is a flow diagram of an embodiment of a method, generally designated 600, of operating a virtual reassembly system constructed in accordance with the principles of the present invention. In FIG. 6, the virtual reassembly system first performs initialization in a step 602.

After initialization, the virtual reassembly system determines if there are any packets to process in a decisional step 604. If the virtual reassembly system received a packet, the virtual reassembly system converts the packet into at least one processing block in a step 610. The virtual reassembly system may then determine an offset to the data portion of each of the processing blocks in a step 612. In one embodiment, the offset is a pointer to the start of the portion of the packet contained within the processing block or the offset is a pointer to the whole packet that is contained within the processing block. In another embodiment, the offset may be a pointer to the start of the protocol data unit of the packet contained within the processing block.

Next, the virtual reassembly system stores the processing block in a step 614. In one embodiment, the virtual reassembly system may store each processing block in a data buffer and in a context memory subsystem. The virtual reassembly system then performs a function on each of the processing blocks in a step 616. In one embodiment, the virtual reassembly system includes a pattern processing engine that performs the function, as discussed above. In a related embodiment, the function may be validating the processing block, matching information in a header of the packet, determining if the packet is in-sequence and performing statistical analysis. Of course, however, the virtual reassembly system may perform other functions on each processing block.

The virtual reassembly system then queues the processing block based upon the header of the packet in a step 618. Queuing may employ linked lists to maintain the order of the processing blocks associated with each protocol data unit. In another embodiment, the queuing may employ at least one queue that maintains the order of the processing blocks.

The virtual reassembly system then determines if the packet being processed is the last packet for that particular protocol data unit in a decisional step 620. If the packet is the last packet, the virtual reassembly system employs an indicator to indicate that second pass processing is to be performed on the processing blocks associated with the protocol data unit in a step 630. The virtual reassembly system then returns to process the next packet in the decisional step 604. If the packet is not the last packet, the virtual reassembly system returns to process the next packet in the decisional step 604.

If the virtual reassembly system does not have any packets to process in the decisional step 604, the virtual reassembly system then determines if it is to perform second pass processing for a particular data unit in a decisional step 640. If no second pass processing is to be performed, the virtual reassembly system then returns to process the next packet in the decisional step 604.

If there is second pass processing to be performed, the virtual reassembly system retrieves each processing block of a protocol data unit based upon the queue and processes the payload of each processing block in a step 650. The virtual reassembly system, in one embodiment, determines the offset to the start of the protocol data unit within each processing block and processes based upon that offset.

Next, the virtual reassembly system may re-transmit the data contained within each of the processing blocks to an output port, without physically reassembling the entire data, in a step 652. In one embodiment, the virtual reassembly system may re-transmit the packet or portion of the packet contained within each processing block. The virtual reassembly system, in another embodiment, may re-transmit the portion of the protocol data unit (payload) contained within each processing block. The virtual reassembly system then returns to process the next packet in the decisional step 604.

One skilled in the art should know that the present invention is not limited to processing packets and then performing second pass processing. The present invention may perform first pass processing on packets associated with one protocol data unit and at the same time perform second pass processing on packets associated with a different protocol data unit. Also, other embodiments of the present invention may have additional or fewer steps than described above.

Figure 7:
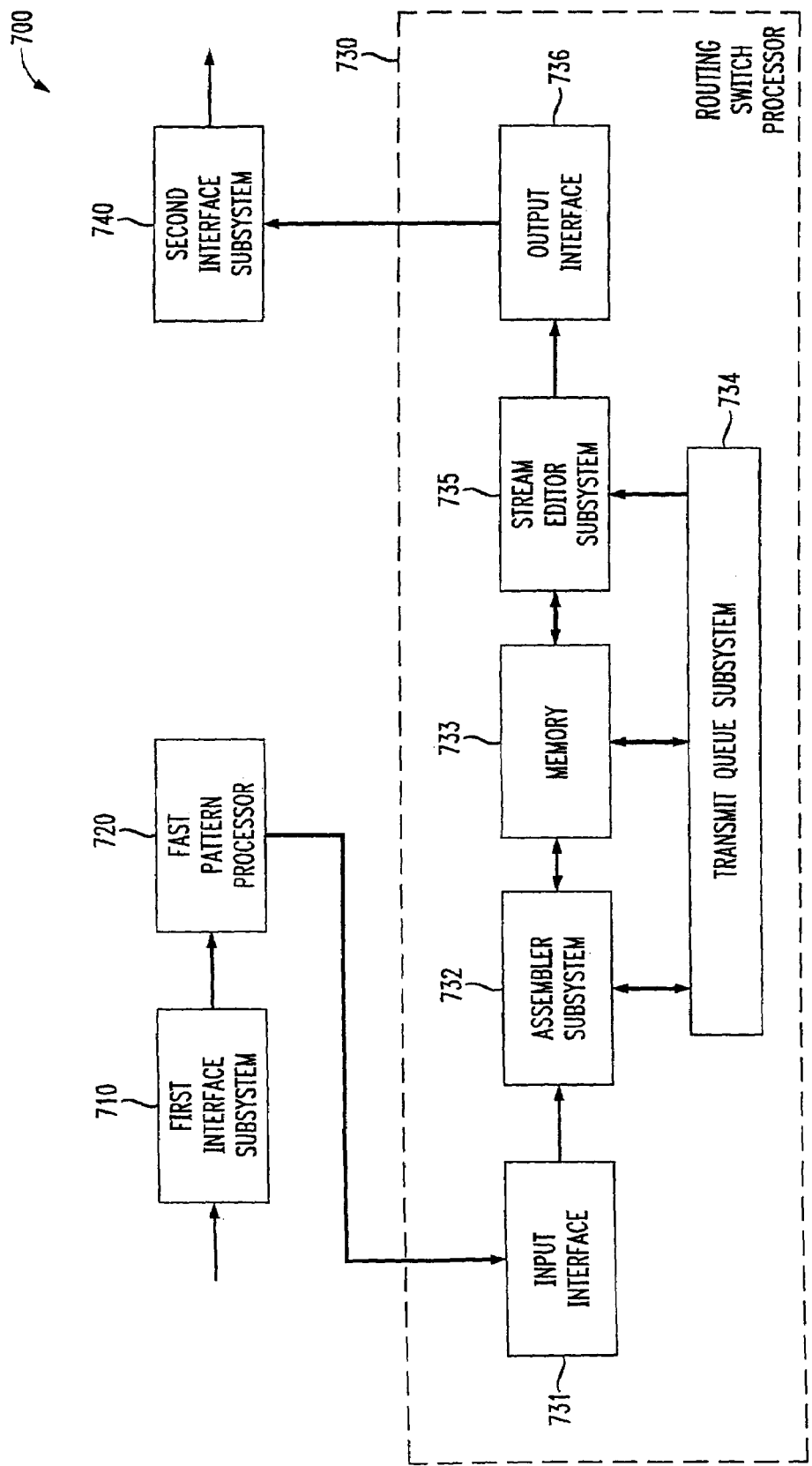
FIG. 7 illustrates a block diagram of an embodiment of a router, which may employ the virtual reassembly system illustrated in FIGS. 4 through 6.

Turning now to FIG. 7, illustrated is a block diagram of an embodiment of a router, generally designated 700, which may employ the virtual reassembly system as discussed above. The router 700 includes a first interface subsystem 710, a fast pattern processor 720, a routing switch processor 730 and a second interface subsystem 740. The first interface subsystem 710 is configured to receive packets of a protocol data unit from a first network in a first protocol. The fast pattern processor 720 is configured to receive the packets from the first interface subsystem 710. The fast pattern processor 720 may also include a virtual reassembly system having a first pass subsystem and a second pass subsystem. See FIGS. 3, 4, 5 and 6 for a detailed description of the fast pattern processor and the virtual reassembly system.

The routing switch processor 730 is configured to receive the packets or a protocol data unit from the fast pattern processor 720. The routing switch processor 730 may also transmit at least a portion of the packets or the protocol data unit to the second interface subsystem 740. The second interface subsystem 740 then transmits the received information to the network. In one embodiment, the second interface subsystem 740 may be coupled to a second network. In a related embodiment, the second interface subsystem 740 may covert from a first protocol associated with the first interface subsystem 710 to a second protocol associated with the second network.

In the illustrated embodiment, the routing switch processor 730 includes an input interface 731, an assembler subsystem 732, memory 733 and a transmit queue subsystem 734. The input interface 731 receives protocol data units from the fast pattern processor 720. The input interface 731 may also receive classification information or routing information from the fast pattern processor 720. In another embodiment, the input interface 731 may also send routing information or transmit commands to the transmit queue subsystem 734.

The assembler subsystem 732 is configured to receive packets or portions of protocol data units from the fast pattern processor 720 via the input interface 731. The assembler subsystem 732 also assembles each protocol data unit and stores the assembled protocol data unit in at least one block in the memory 733. In one embodiment, the assembler subsystem 732 may request the transmit queue subsystem 734 to allocate space in the memory 733 for each protocol data unit.

The transmit queue subsystem 734 is configured to maintain a linked list of each packet associated with each of the protocol data units. In another embodiment, the transmit queue subsystem 734 may maintain a linked list for each block of a protocol data unit stored in the memory 733. The transmit queue subsystem 734 is also configured to perform a router function on the received packet or the protocol data unit contained within the blocks and maintain at least one queue for transmission of the protocol data unit.

The routing switch processor 730 may also include a stream editor subsystem 735 and an output interface 736. The stream editor subsystem 735 is configured to perform packet modification on the protocol data units as they are being sent to the output interface 736 for transmission. The modifications may include modifying the protocol data unit to implement IP and upper layer protocols, encapsulating the protocol data unit into AAL5 protocol data units and converting or segmenting the protocol data unit into ATM cells with the appropriate header information.

In one embodiment, the stream editor subsystem 735 may perform virtual segmentation of the protocol data unit. For example, the assembler subsystem 732 stores portions of the protocol data unit in blocks as it is received. The blocks associated with the protocol data unit may not be stored in contiguous locations and may have multiple blocks from different protocol data units interleaved between them. Instead of retrieving and physically reassembling the entire protocol data unit before segmenting the protocol data unit, the stream editor subsystem 735 advantageously performs the segmentation on each block as it is retrieved. The segmentation may include converting the block to the appropriate transmission protocol and append header information. For example, if the protocol data unit is an IP message, the stream editor subsystem 735 retrieves each block of the IP message, stores a portion of the IP message in an ATM cell, adds an ATM cell header and transmits the ATM cell. Of course, however, the present invention is not limited to the type of segmentation described above. In other embodiments, the present invention may perform additional or other steps than described above.

Although the present invention has been described in detail, those skilled in the art should understand that they can make various changes, substitutions and alterations herein without departing from the spirit and scope of the invention in its broadest form.

What is claimed is:

1. For use with a virtual reassembly system, a first pass system, comprising:
    an input framer configured to convert a packet of a protocol data unit into at least one processing block;
    a pattern processing engine configured to queue said at least one processing block, based upon a header of said packet;
    a data buffer configured to store said at least one processing block;
    a context memory subsystem configured to receive and associate said at least one processing block with a context, said pattern processing engine receives said at least one processing block and said context from said context memory subsystem; and
    a data buffer controller configured to receive said at least one processing block from said input framer and send said at least one processing block to said data buffer and said context memory subsystem.

2. The first pass system as recited in claim 1 wherein said pattern processing engine is further configured to determine if said packet is a last packet of said protocol data unit.

3. The first pass system as recited in claim 1 wherein said input framer is further configured to determine an offset to a data portion of said processing block and assign a context.

4. The first pass system as recited in claim 1 further comprising a queue engine configured to maintain an order of each said packet associated with said protocol data unit and maintain an order of all of said at least one processing block associated with said protocol data unit, said queue engine maintaining order based upon said header of said packet or based upon a header of said protocol data unit.

5. The first pass system as recited in claim 1 wherein said pattern processing engine is further configured to perform a function on said at least one processing block selected from the group consisting of:
    validating said at least one processing block,
    matching information in said header of said packet,
    determining if said packet is in-sequence, and
    statistical analysis.

6. The first pass system as recited in claim 1 wherein said pattern processing engine determines routing information from a protocol data unit header within said least one processing block.

7. A method of operating a first pass system associated with a virtual reassembly system, comprising:
    converting a packet of a protocol data unit into at least one processing block;
    queuing said at least one processing block allowing retrieval thereof;
    storing said at least one processing block in a data buffer;
    receiving and associating said at least one processing block with a context in a context memory subsystem;
    receiving said at least one processing block and said context from said context memory subsystem in a pattern processing engine; and
    receiving said at least one processing block from an input framer subsystem in a data buffer controller and sending said at least one processing block to said data buffer and said context memory subsystem by said data buffer controller.

8. The method as recited in claim 7 further comprising determining if said packet is said last packet of said protocol data unit.

9. The method as recited in claim 7 wherein said converting further comprises determining an offset to a data portion of said processing block and assign a context.

10. The method as recited in claim 7 further comprising:
    maintaining an order of each said packet associated with said protocol data unit and maintaining an order of all of said at least one processing block associated with said protocol data unit; and
    maintaining an order based upon said header of said packet or based upon a header of said protocol data unit.

11. The method as recited in claim 7 further comprises performing a function on said at least one processing block selected from the group consisting of:
    validating said at least one processing block,
    matching information in said header of said packet,
    determining if said packet is in-sequence, and
    statistical analysis.

12. The method as recited in claim 7 further comprising determining routing information from a protocol data unit header within said at least one processing block.

13. A fast pattern processor that receives different protocol data units, comprising:
    a memory; and
    a virtual reassembly system configured to process packets of each of said different protocol data units without recreating said each of said different protocol data units in a contiguous portion of said memory, said virtual reassembly system including a first pass subsystem configured to determine if each of said packets is a last packet of one of said different protocol data units.

14. The fast pattern processor as recited in claim 13 wherein said first pass subsystem comprises:
 an input framer subsystem that converts said packets into processing blocks;
 a pattern processing engine that queues said processing blocks based upon a header of said each of said packets.

15. The fast pattern processor as recited in claim 14 wherein said pattern processing engine is further configured to determine if said each of said packets is a last packet of one of said different protocol data units.

16. The fast pattern processor as recited in claim 14 wherein said input framer further determines offsets to a data portion of said processing blocks and assigns a context to each of said processing blocks.

17. The fast pattern processor as recited in claim 14 wherein said first pass subsystem further comprises a data buffer controller that receives said processing blocks from said input framer subsystem and sends said processing blocks to a data buffer and a context memory subsystem, said context memory subsystem receives and associates each of said processing blocks with a context, said pattern processing engine receives each of said processing blocks and said context from said context memory subsystem.

18. The fast pattern processor as recited in claim 14 wherein said first pass subsystem further comprises a queue engine that maintains an order of each of said packets associated with said one of said different protocol data units and maintains an order of all of said processing blocks associated with said one of said different protocol data units, said queue engine maintaining order based upon said header of said each of said packets or based upon a header of said one of said different protocol data units.

19. The fast pattern processor as recited in claim 14 wherein said pattern processing engine also performs a function on each of said processing blocks selected from the group consisting of:
 validating said at least one processing block,
 matching information in said header of said packet,
 determining if said packet is in-sequence, and
 statistical analysis.

20. The fast pattern processor as recited in claim 14 wherein said pattern processing engine determines routing information from an encapsulated protocol data unit header within said processing blocks associated with said one of said different protocol data units.

21. A router, comprising:
 a first and second interface subsystem;
 a fast pattern processor, configured to receive a packet of a protocol data unit from said first interface subsystem, including:
  a memory; and
  a virtual reassembly system configured to process said packet without recreating said protocol data unit in a contiguous portion of said memory, said virtual reassembly system including a first pass subsystem configured to determine if said packet is a last packet of said protocol data unit, and
 a routing switch processor configured to transmit via said second interface subsystem at least one of said packet or said protocol data unit from said fast pattern processor.

22. The router as recited in claim 21 wherein said first pass subsystem includes:
 an input framer subsystem configured to convert said packet into said at least one processing block;
 a pattern processing engine configured to queue said at least one processing block based upon a header of said packet.

23. The router as recited in claim 22 wherein said pattern processing engine is further configured to determine if said packet is a last packet of said protocol data unit.

24. The router as recited in claim 22 wherein said pattern processing engine determines routing information from an encapsulated protocol data unit header within said at least one processing block and transmits said routing information to said routing switch processor.

25. The router as recited in claim 21 wherein said routing switch processor further comprises:
 an assembler subsystem that receives said packet from said fast pattern processor and assembles said protocol data unit; and
 a transmit queue subsystem that maintains a linked list associated with said protocol data unit, performs a function on said packet or said protocol data unit and maintains at least one queue structure for transmission.

26. The router as recited in claim 25 wherein said assembler subsystem further stores said packet in at least one block and said transmit queue subsystem further maintains a linked list of said at least one block.

27. The router as recited in claim 21 wherein said routing switch processor further comprises a stream editor subsystem that performs packet modification on said protocol data unit.

28. The router as recited in claim 27 wherein said stream editor subsystem performs virtual segmentation on said protocol data unit.

29. The router as recited in claim 21 wherein said router converts between a first protocol associated with said first interface and a second protocol associated with said second interface.

* * * * *